United States Patent [19]

Clough et al.

[11] Patent Number: 5,352,517
[45] Date of Patent: Oct. 4, 1994

[54] IRON OXIDE COATED SUBSTRATES

[75] Inventors: Thomas J. Clough, Santa Monica; Victor L. Grosvenor, Topanga; Naum Pinsky, Thousand Oaks, all of Calif.

[73] Assignee: Ensci, Inc., Pismo Beach, Calif.

[21] Appl. No.: 183,990

[22] Filed: Jan. 18, 1994

Related U.S. Application Data

[60] Division of Ser. No. 743,827, Aug. 12, 1991, Pat. No. 5,290,589, which is a continuation-in-part of Ser. No. 621,660, Dec. 3, 1990, Pat. No. 5,204,140, which is a continuation-in-part of Ser. No. 348,789, May 8, 1989, Pat. No. 5,167,820, Ser. No. 348,788, May 8, 1989, Pat. No. 5,039,845, Ser. No. 348,787, May 8, 1989, abandoned, and Ser. No. 348,786, May 8, 1989, Pat. No. 5,182,165, each is a continuation-in-part of Ser. No. 272,517, Nov. 17, 1988, abandoned, and Ser. No. 272,539, Nov. 17, 1988, abandoned, each is a continuation-in-part of Ser. No. 82,277, Aug. 6, 1987, Pat. No. 4,787,125, which is a division of Ser. No. 843,047, Mar. 24, 1986, Pat. No. 4,713,306.

[51] Int. Cl.$^5$ ............................................. B32B 19/00
[52] U.S. Cl. ..................................... 428/357; 428/375; 428/379; 428/388; 428/389; 428/402; 428/403
[58] Field of Search ............... 428/283, 284, 402, 403, 428/902, 114, 294, 323, 357, 402, 403, 375, 379, 388, 389

[56] References Cited

U.S. PATENT DOCUMENTS

| | | | |
|---|---|---|---|
| 4,405,697 | 9/1983 | Rowlette | 429/161 |
| 4,510,219 | 4/1985 | Rowlette | 429/212 |
| 4,539,268 | 9/1985 | Rowlette | 429/54 |
| 4,542,082 | 9/1985 | Rowlette | 429/210 |
| 4,547,443 | 10/1985 | Rowlette et al. | 429/217 |

Primary Examiner—James J. Bell
Attorney, Agent, or Firm—Frank J. Uxa, Jr.

[57] ABSTRACT

Processes for coating substrates, in particular substrates including shielded surfaces, with iron oxide-containing coatings are disclosed. Such processes comprise contacting a substrate with an iron oxide precursor, preferably maintaining the precursor coated substrate at conditions to equilibrate the coating, and then oxidizing the precursor to form a substrate containing iron oxide. Also disclosed are substrates coated with iron oxide-containing coatings for use in various magnetic applications.

22 Claims, 2 Drawing Sheets

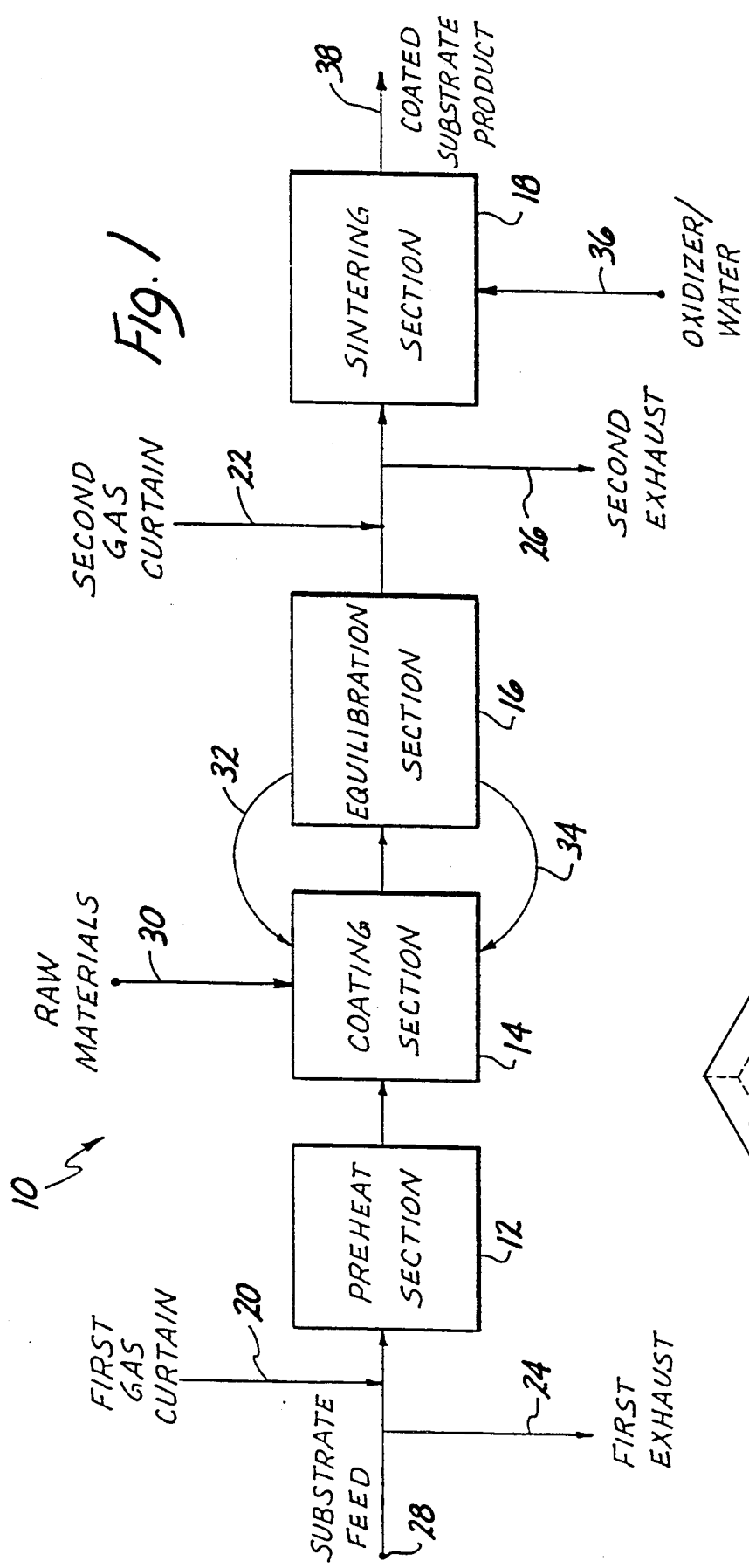
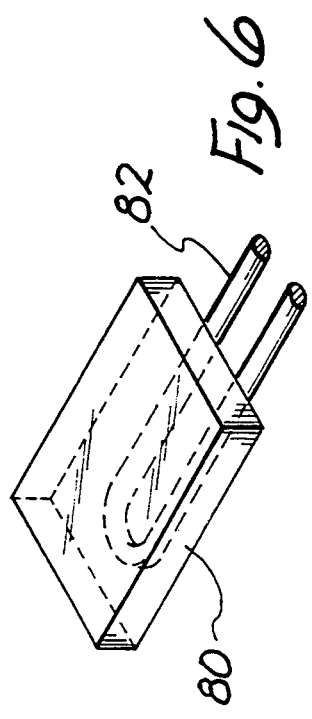

IRON OXIDE COATED SUBSTRATES

RELATED APPLICATIONS

This application is a division of application Ser. No. 07/743,827, filed Aug. 12, 1991, U.S. Pat. No. 5,290,589 which is a continuation in part of application Ser. No. 621,660 filed Dec. 3, 1990 now U.S. Pat. No. 5,204,140, which application in turn is a continuation-in-part of application Ser. Nos. 348,789 now U.S. Pat. No. 5,167,820; 348,788 now U.S. Pat. No. 5,039,845; 348,787 now abandoned and 348,786 now U.S. Pat. No. 5,182,165, each filed May 8, 1989, each of which applications is a continuation-in-part of application Ser. Nos. 272,517 and 272,539, each filed Nov. 17, 1988 now abandoned, each of which applications in turn, is a continuation-in-part of application Ser. No. 082,277, filed Aug. 6, 1987 (now U.S. Pat. 4,787,125) which application, in turn, is a division of application Ser. No. 843,047, filed Mar. 24, 1986, now U.S. Pat. No. 4,713,306. Each of these earlier filed applications and these U.S. Patents is incorporated in its entirety herein by reference.

BACKGROUND OF THE INVENTION

The present invention relates to a process for coating a substrate. More particularly, the invention relates to coating a substrate with a iron oxide-containing material, preferably a magnetic iron oxide-containing material.

An application where substrates with coatings, e.g., magnetic conductive coatings, find particular usefulness is memory cores, linear, power and recording head application, magnets and heating.

In many of the above-noted applications it would be advantageous to have a magnetic iron oxide which is substantially uniform, has high permeability, and has good chemical properties, e.g., morphology, stability, etc.

A number of techniques may be employed to provide conductive iron oxide coatings on substrates. Most ferrites are prepared as ceramic materials by standard ceramic processing. In this process the constituent raw materials, oxides, hydroxides, or carbonates, are weighed and first milled in a steel mill using steel balls as the milling media and water as the carrier. During milling, the raw materials are mixed to yield a homogeneous mixture. Other mixing methods may also be employed such as dry mixing of raw materials. The milling gives uniform mixing and results in some size reduction leading to better reactivity in the calcining step. In the calcining (sometimes called presintering) reaction, the raw materials are heated to 800° to 1300° C. and form the ferrite compound. The carbonates decompose and react by solid-state diffusion to form the final compound.

In the case of the nickel-zinc-spinel ferrites, the powder is calcined at a temperature of ca 1027° C. to yield an agglomerated, friable powder that is essentially 100% converted to the spinel phase. However, in the case of the manganese-zinc-ferrites, the calcining conditions are such that the material is 50–85% converted to spinel. Time and temperature are the most important control parameters in the calcining step.

The purpose of this millings is to further homogenize the material and to reduce the particle size to permit subsequent pressing and sintering. The milling itself can be carried out in a variety of ways, for example, wet-ball mill with steel balls in a manner analogous to the first milling. The main objective is to get a finely divided powder that can be slurried and spray dried.

Following the second milling, the material must be granulated so that it will be free flowing and can be dry pressed into the desired shape. A method for producing ferrite powder is to add a binder such as poly(ethylene glycol) or poly(vinyl alcohol) at 1–4 wt % and sufficient water for form a slurry that is about 65–70 wt % ferrite. The slurry is spray dried to yield a dry powder consisting of small spherical particles having a narrow size distribution.

Very thin parts, such as used in memory cores, may be formed by tape casting followed by punching the desired shape. Parts that have a high length-to-diameter ratio may be formed by either extrusion or by isostatic pressing.

In the sintering process, the ceramic material is densified and the final magnetic properties are developed. Some materials such as the iron-deficient nickel-zinc=ferrites and the M-type hexagonal ferrites may be fired in air because all the cations exist at their highest valence state. However, with the manganese-zinc ferrites the amount of ferrous iron ($Fe^{2+}$) in the crystal lattice is controlled. Typical temperatures for the sintering zone are in the range of 1275°–1450° C.; sintering time may range from 20 minutes to 12 hours.

The next zone in the kiln is called the anneal or equilibration zone, where the temperature is dropped to 1000°–1300° C. and the oxygen content of the atmosphere is lowered by the introduction of nitrogen gas. At this elevated temperature the ferrite equilibrates quickly with the atmosphere, and the desired ferrous iron level is established. Following the annealing step, the parts are cooled as rapidly as possible and the oxygen content of the atmosphere is reduced still further.

In an attempt to improve chemical homogeneity, a wet-chemical process was designed in which an aqueous solution was prepared containing the metal cations. Addition of a strong base (e.g., NaOH) precipitated an intermediate hydroxide which was subsequently oxidized by bubbling air through the suspension. The results was a homogeneous fine-particle ferrite. A similar type of process used an ammonium bicarbonate-ammonium hydroxide mixture as the precipitating agent followed by conventional calcining.

The preparation of ferrite compounds by the cryochemical method has also been investigated. In this technique, an aqueous solution is sprayed into a chilled liquid (e.g., hexane) where the droplets freeze into beads ca), 0.4 mm diameter. These pellets are removed from the liquid and placed in a freeze dryer where the moisture is removed by sublimation. The resultant pellets are converted to the spinel by calcining.

The preparation of the hexagonal ferrites by wet-chemical precipitation, topotactic reaction, and fluidized-bed reaction has been investigated. However, the most common method is standard ceramic processing.

Critical areas of process control in the conventional type processing are the composition and the presintering conditions. The calcining step is especially critical because it determines to a large extent the properties of the magnet after sintering. At a typical calcining temperature of 1300° C. the material reacts completely to form the hexagonal phase. If calcining takes place at a lower temperature, the magnetic properties are not affected adversely but the calcined material is too soft and the subsequent milling step which gives a very fine particle size. This leads to difficulty in pressing and a very high shrinkage during sintering. If, on the other hand, the sintering temperature is too high, the particles are too hard and the particle size after milling is rather coarse. Although this does not cause a pressing problem, after sintering the particles are too large and the shrinkage and coercive force are both too low.

After calcining the material must be milled to reduce the particle size to the range of 1 μm in order to obtain single-domain properties.

Fabrication of the milled powder into parts can take place by a number of methods depending on the degree of magnetic alignment desired. For the lowest-grade material, the milled powder is spray dried and then dry pressed into the required shape. In these materials, the individual particles are randomly aligned with respect to each other, resulting in a isotropic magnet in which the magnetic properties are the same in all directions.

Anisotropic magnets are prepared by dry or wet pressing the material in the presence of an external magnetic field which causes the individual magnetic particles to align themselves with that field. The drypressing technique is quite similar to that used for preparing isotropic magnets, except that pressing takes place in the presence of a magnetic field.

Wet pressing, gives the highest degree of alignment with the field because the individual particles are much freer to rotate under its influence. When alignment is essentially complete, the water is removed by applying a vacuum to the die cavity, and a very fine filter paper prevents the powder from being pulled out with the water.

Sintering of dry-pressed parts can take place immediately after forming. However, wet-pressed parts must be carefully dried to remove most of the residual moisture before being placed in the kiln. Drying under controlled conditions may take from 10 to 200 hours, depending on size and shape.

The pressed parts are sintered in the air at 1125°–1375° C. to yield a dense ceramic material. In order to minimize the grain growth that occurs during sintering, the firing temperature is kept as low as possible.

Conventional processing has been used for the preparation of powder for follow on consolidation into final shapes. Such processing has not been directed at or concerned with thin and/or thick films and a wide variety of inorganic substrates, the Novel components and articles produced or the unique properties of such coated components in a wide variety of applications.

One of the preferred substrates for use in certain magnetic mechanical devices are inorganic substrate, in particular flakes, spheres, fibers and other type particles.

SUMMARY OF THE INVENTION

A new process for at least partially coating a substrate with a iron oxide-forming material has been discovered. In brief, the process comprises contacting the substrate with a iron oxide precursor, for example, an iron chloride precursor such as ferric chloride the hexahydrate thereof here in after referred to as iron chloride precursor in a vaporous form and/or in a liquid form and/or in a solid (e.g., powder) form, to form a iron oxide precursor-containing coating, for example, a iron chloride-containing coating, on the substrate; preferably contacting the substrate with an additional magnetic and/or property enhancing interacting and/or dopant components, i.e., an interacting component containing for example nickel, zinc, manganese, barium, strontium, lead, calcium, boron, titanium, silica yttrium, lanthanum and the rare earths (as in a compound), to form a interacting component-containing coating on the substrate; and contacting the coated substrate with an oxidizing agent to form a iron oxide-containing, coating on the substrate. The contacting of the substrate with the iron oxide precursor and with the interacting component can occur together, i.e., simultaneously, and/or in separate steps.

This process can provide coated substrates which have substantial magnetic permeability so as to be suitable for use as components in magnetic type elements, articles and applications. Substantial coating uniformity, e.g., in the thickness of the iron oxide-containing coating and in the distribution of dopant component in the coating, is obtained. Further, the present doped iron oxide coated substrates have outstanding stability, e.g., in terms of magnetic and mechanical properties and morphology, and are thus useful in various applications. In addition, the process is efficient in utilizing the materials which are employed to form the coated substrate.

DETAILED DESCRIPTION OF THE INVENTION

In one broad aspect, the present coating process comprises contacting a substrate with a composition comprising an iron oxide precursor, such as iron chloride precursor and hydrates, iron organic and complexes, iron sulfate hydrates and mixtures thereof, preferably ferric chloride and hydrates, at conditions, preferably substantially non-deleterious oxidizing conditions, more preferably in a substantially inert environment or atmosphere, effective to form a iron oxide precursor-containing coating, such as a iron chloride-containing coating, on at least a portion of the substrate. The substrate is preferably also contacted with at least one interacting component, as set forth at conditions, preferably substantially non-deleterious oxidizing conditions, more preferably in a substantially inert atmosphere, effective to form a interacting forming component-containing coating, such as a nickel, zinc, and manganese or zinc and yttrium and gadolinium component-containing coating, on at least a portion of the substrate. This substrate, including one or more coatings containing iron oxide precursor, for example ferric chloride and the hexahydrate and preferably an interacting-forming component, is contacted with at least one oxidizing agent at conditions effective to convert the iron oxide precursor to iron oxide and form a iron oxide-containing coating, preferably with an interacting nickel/zinc and/or manganese/zinc on at least a portion of the substrate. By "non-deleterious oxidation" is meant that the majority of the oxidation of iron oxide precursor, for example ferric chloride, coated onto the substrate takes place in the oxidizing agent contacting step of the process, after distribution, and/or equilibration of the precursor rather than in process step or steps conducted at non-deleterious oxidizing conditions. The process as set forth below will be described in many instances with reference to ferric chloride including its hexahydrate which has been found to provide particularly outstanding process and product properties. The hexahydrate is preferred for process temperatures below 300° C. although a compatible solvent system for ferric chloride can also be used. However, it is to be understood that other suitable iron oxide precursors are included within the scope of the present invention.

The interacting-forming component-containing coating may be applied to the substrate before and/or after and/or during the time the substrate is coated with iron chloride. In a particularly useful embodiment, the iron chloride and the interacting-forming component are both present in the same composition used to contact the substrate so that the iron chloride-containing coating further contains the interacting-forming component. This embodiment provides processing efficiencies since the number of process steps is reduced (relative to separately coating the substrate with iron chloride and interacting-forming component). In addition, the relative amount of iron chloride and dopant-forming component used to coat the substrate can be effectively controlled in this "single coating composition" embodiment of the present invention.

In another useful embodiment, the substrate with the iron chloride-containing coating and the interacting-forming component-containing coating is maintained at conditions, preferably at substantially non-deleterious oxidizing conditions, for example, conditions which reduce and/or minimize the formation of iron oxide on a relatively small portion of the substrate or off the substrate, for a period of time effective to do at least one of the following: (1) coat a larger portion of the substrate with iron chloride-containing coating; (2) distribute the iron chloride coating over the substrate; (3) make the iron chloride-containing coating more uniform in thickness; and (4) distribute the interacting-forming component more uniformly in the iron chloride-containing coating. Such maintaining preferably occurs for a period of time in the range of about 0.05 or 0.1 minute to about 20 minutes in the presence of an inert gas and/or oxygen i.e. air, under non-deleterious oxidizing conditions. Such maintaining is preferably conducted at the same or a higher temperature relative to the temperature at which the substrate/iron chloride-containing composition contacting occurs. Such maintaining, in general, acts to make the coating more uniform and, thereby, for example, provides for beneficial electrical conductivity properties. The thickness of the iron oxide-containing coating is preferably in the range of about 0.1 micron to about 100 microns, more preferably about 1 micron to about 50 microns.

The iron chloride which is contacted with the substrate is in a vaporous phase or state, or in a liquid phase or state, or in a solid state or phase (powder) at the time of the contacting. The composition which includes the iron chloride preferably also includes the interacting-forming component or components. This composition may also include one or more other materials, e.g., dopants, catalysts, grain growth inhibitors, solvents, etc., which do not substantially adversely promote the premature hydrolysis and/or oxidation of the iron chloride and/or the interacting-forming component, and do not substantially adversely affect the properties of the final product, such as by leaving a detrimental residue in the final product prior to the formation of the iron oxide-containing coating. Thus, it has been found to be important, e.g., to obtaining a iron oxide coating with good structural, mechanical and/or magnetic properties, that undue hydrolysis of the iron chloride and interacting-forming component be avoided. Examples of useful other materials include organic components such as acetonitrile, ethyl acetate, dimethyl sulfoxide, propylene carbonate and mixtures thereof; certain inorganic salts and mixtures thereof. These other materials, which are preferably substantially anhydrous, may often be considered as a carrier, e.g., solvent, for the iron chloride and/or dopant-forming component to be contacted with the substrate. It has also been found that the substrate can first be contacted with a iron oxide precursor powder, particularly iron chloride powder, preferably with a film forming amount of such powder, followed by increasing the temperature of the powder to the liquidus point of the powder on the substrate and maintaining the coated substrate for a period of time at conditions including the increased temperature effective to do at least one of the following: (1) coat a larger portion of the substrate with the iron oxide precursor-containing coating; (2) distribute the coating over the substrate; and (3) make the coating more uniform in thickness. Preferably, this step provides for the equilibration of the coating on the substrate. The size distribution of the powder, for example, iron chloride powder, and the amount of such powder applied to the substrate are preferably chosen so as to distribute the coating over substantially the entire substrate.

The iron oxide precursor powder can be applied to the substrate as a powder, particularly in the range of about 5 or about 10 to about 125 microns in average particle size the size in part being a function of the particle size, i.e. smaller particles generally require smaller size powders. The powder is preferably applied as a charged fluidized powder, in particular having a charge opposite that of the substrate or at a temperature where the powder contacts and adheres to the substrate rate. In carrying out the powder coating, the coating system can be, for example, one or more electrostatic fluidized beds, spray systems having a fluidized chamber, and other means for applying powder, preferably in a film forming amount. The amount of powder used is generally based on the thickness of the desired coating and incidental losses that may occur during processing. The powder process together with conversion to a iron oxide-containing coating can be repeated to achieve desired coating properties, such as desired gradient conductivities.

Typically, the fluidizing gaseous medium is selected to be compatible with the iron oxide precursor powder, i.e., to not substantially adversely affect the formation of a coating on the substrate during melting and ultimate conversion to a iron oxide-containing film.

Generally, gases such as air, nitrogen, argon, helium and the like, can be used, with air being a gas of choice, where no substantial adverse prehydrolysis or oxidation reaction of the powder precursor takes place prior to the oxidation-reaction to the iron oxide coating as previously discussed under equilibration and maintaining. The gas flow rate is typically selected to obtain fluidization and charge transfer to the powder. Fine powders require less gas flow for equivalent deposition. It has been found that small amounts of water vapor enhance charge transfer. The temperature of the powder precursor is generally in the range of about 0° C. to about 100° C., or higher more preferably about 20° C. to about 40° C., and still more preferably about ambient temperature. The substrate however, can be at a temperature the same as, higher or substantially higher than the powder.

The time for contacting the substrate with precursor powder is generally a function of the substrate bulk density, thickness, powder size and gas flow rate. The particular coating means is selected in part according to the above criteria, particularly the geometry of the substrate. For example, particles, spheres, flakes, short fibers and other similar substrate, can be coated directly in a fluidized bed themselves with such substrates being in a fluidized motion or state. For fabrics and rovings a preferred method is to transport the fabric and/or roving directly through a fluidized bed for powder contacting. In the case of rovings, a fiber spreader can be used which exposes the filaments within the fiber bundle to the powder. The powder coating can be adjusted such that all sides of the substrate fabric, roving and the like are contacted with powder. Typical contacting time can vary from seconds to minutes, preferably in the range of about 1 second to about 120 seconds, more preferably about 2 seconds to about 30 seconds.

Typical iron oxide precursor powders are those that are powders at powder/substrate contacting conditions and which are liquidus at the maintaining conditions, preferably equilibration conditions, of the present process. It is preferred that the powder on melting substantially wets the surface of the substrate, preferably having a low contact angle formed by the liquid precursor in contact with the substrate and has a relatively low viscosity and low vapor pressure at the temperature conditions of melting and maintaining, preferably melting within the range of about 300° C. to about 450° C., or higher, more preferably about 350° C. to about 300° C. Typical powder iron oxide precursors are ferric chloride, low molecular weight complexes of iron, such as poly functionality and complexes with carboxylic, ketone and hydroxyl functionality, such as acetylacetonate complexes of iron.

An additional component powder, such as a dopant-forming powder, can be combined with the iron oxide precursor powder. Particularly preferred interacting-forming powders are compounds of nickel, zinc, manganese, yttrium, the rare earths, barium, calcium and silica. Further, an additional component, such as an interacting component, for example a chloride hydrate and/or nitrate hydrate and/or a 2, 5 complex can be incorporated into the coating during the maintaining step, for example zinc acetylacetonate gas as a source of the metal interacting compound, preferably in a hydrogen chloride atmosphere. A combination of the two methods can also be used for additional component incorporation, The powder iron oxide precursor on melting is maintained and/or equilibrated as set forth above. In addition, temperatures can be adjusted and/or a component introduced into the melting/maintaining step which can aid in altering the precursor for enhanced conversion to iron oxide. For example, gaseous hydrogen chloride can be introduced to form partial or total halide salts and/or the temperature can be adjusted to enhance decomposition of, for example, iron or interacting organic salts and/or complexes to more readily oxidizable iron compounds. The interacting compound can also be present in an oxide or precursor form in the melt as a dispersed preferably as a finely dispersed solid. The oxide can be incorporated advantageously as part of the powder coating of the substrate material.

A fluidizable coated substrate, such as substrates coated directly in a fluid bed of powder, can be subjected to conditions which allow liquidus formation by the iron oxide precursor and coating of the substrate. A particularly preferred process uses a film forming amount of the iron oxide precursor which allows for coating during the liquidus step of the process, and which substantially reduces detrimental substrate agglomeration. The conditions are adjusted or controlled to allow substantially free substrate fluidization and transport under the conditions of temperature and bed density, such as dense bed density to lean bed density. The coated substrate can be further transported to the oxidation step for conversion to iron oxide or converted directly to iron oxide in the same reactor/processing system. A particularly preferred embodiment is the transport of the liquidus coated substrate as a dense bed to a fluidized oxidation zone, such zone being a fluidized zone preferably producing a conversion to iron oxide on the substrate of at least about 80% by weight.

The iron chloride precursor and/or interacting-forming component to be contacted with the substrate may be present in a molten state. For example, a melt containing molten iron chloride precursor and/or interacting metal compound may be used. The molten composition may include one or more other materials, having properties as noted above, to produce a mixture, e.g., a eutectic mixture, having a reduced melting point and/or boiling point. The use of molten iron chloride precursor and/or interacting-forming component provides advantageous substrate coating while reducing the handling and disposal problems caused by a solvent. In addition, the substrate is very effectively and efficiently coated so that coating material losses are reduced.

The iron chloride precursor and/or interacting-forming component to be contacted with the substrate may be present in a vaporous state. As used in this context, the term "vaporous state" refers to both a substantially gaseous state and a state in which the iron chloride precursor and/or interacting-forming component are present as drops or droplets and/or mist in a carrier gas, i.e., an atomized state. Liquid state iron chloride precursor and/or interacting-forming component may be utilized to generate such "vaporous state" compositions.

In addition to the other materials, as noted above, the composition containing iron chloride precursor and/or the interacting-forming component may also include one or more grain growth inhibitor components. Such inhibitor component or components are present in an amount effective to inhibit grain growth in the iron oxide-containing coating. Of course, such grain growth inhibitor components should have no substantial detrimental effect on the final product.

The interacting-forming component may be deposited on the substrate separately from the iron chloride precursor, e.g., before and/or during and/or after the iron chloride precursor/substrate contacting. If the interacting-forming component is deposited on the substrate separately from the iron chloride precursor, it is preferred that the interacting-forming component, for example, the nickel, manganese or zinc component, be deposited after the iron chloride precursor, such as to form soluble and/or eutectic mixtures and/or dispersion.

Any suitable interacting-forming component may be employed in the present process. Such interacting-forming component should provide sufficient concentration so that the final iron oxide coating has the desired properties, e.g., magnetic, high permeability, stability, etc. Care should be exercised in choosing the interacting-forming component or components for use. For example, the interacting-forming component should be sufficiently compatible with the iron chloride precursor so that the desired doped iron oxide coating can be formed. Interacting-forming components which have excessively high boiling points and/or are excessively volatile (relative to the iron precursor), at the conditions employed in the present process, are not preferred since, for example, the final coating may not have optimum properties and/or a relatively large amount of the interacting-forming component or components may be lost during processing. It may be useful to include one or more property altering components, e.g., boiling point depressants, in the composition containing the interacting-forming component to be contacted with the substrate. Such property altering component or components are included in an amount effective to alter one or more properties, e.g., boiling point, of the interacting-forming component, e.g., to improve the compatibility or reduce the incompatibility between the dopant-forming component and iron chloride precursor. Preferred dopant oxide precursors are set for above and include the halide, preferably the chlorides, organic complexes, such as low molecular poly functional organic acids, complexes, preferably 2, 5, alkoxides, benzylates and the like. The preferred interacting components are those that provide for optimum interacting component incorporation while minimizing interacting precursor losses, particularly under the preferred process condition as set forth herein. Oxides or suboxides can also be used where interacting component incorporation is accomplished during the oxidation sintering contacting step.

The use of a interacting component is an important feature of certain aspects of the present invention. First, it has been found that interacting component can be effectively and efficiently incorporated into the iron oxide-containing coating. In addition, such interacting components act to provide iron oxide-containing coatings with good magnetic properties referred to above, morphology and stability.

The liquid, e.g., molten, composition which includes iron chloride precursor may, and preferably does, also include the interacting-forming component. In this embodiment, the interacting-forming component or components are preferably soluble and/or dispersed homogeneously in the composition. Vaporous mixtures of interacting compounds and iron oxide forming components may also be used. Such compositions are effective since the amount of interacting components in the final iron oxide coating can be controlled by controlling the make-up of the composition. In addition, both the iron chloride precursor and interacting-forming component are deposited on the substrate in one step. Moreover, if chlorides or organic precursors are used, such precursor components are converted to oxides during the oxidizing agent/substrate contacting step. This enhances the overall utilization of the coating components in the present process.

In one embodiment, a vaporous iron chloride precursor composition is utilized to contact the substrate, and the composition is at a higher temperature than is the substrate. The make-up of the vaporous iron chloride-precursor containing composition is such that iron chloride precursor condensation occurs on the cooler substrate. If the interacting-forming component is present in the composition, it is preferred that such interacting-forming component also condense on the substrate. The amount of condensation can be controlled by controlling the chemical make-up of the vaporous composition and the temperature differential between the composition and the substrate. This "condensation" approach very effectively coats the substrate to the desired coating thickness without requiring that the substrate be subjected to numerous individual or separate contactings with the vaporous iron chloride-precursor containing composition.

The substrate including the iron chloride-precursor containing coating and the interacting-forming component-containing coating is contacted with an oxidizing agent at conditions effective to convert iron chloride precursor to iron oxide, and form an iron oxide coating on at least a portion of the substrate. Water, e.g., in the form of a controlled amount of humidity, can be present provided that substantial deleterious changes in final iron oxide properties are controlled and/or minimized during the coated substrate/oxidizing agent contacting.

Any suitable oxidizing agent may be employed, provided that such agent functions as described herein. Preferably, the oxidizing agent (or mixtures of such agents) is substantially gaseous at the coated substrate/oxidizing agent contacting conditions. The oxidizing agent preferably includes reducible oxygen, i.e., oxygen which is reduced in oxidation state as a result of the coated substrate/oxidizing agent contacting. More preferably, the oxidizing agent comprises molecular oxygen, either alone or as a component of a gaseous mixture, e.g., air.

The substrate may be composed of any suitable material and may be in any suitable form. Preferably, the substrate is such so as to minimize or substantially eliminate the migration of ions and other species, if any, from the substrate to the iron oxide-containing coating which are deleterious to the functioning or performance of the coated substrate in a particular application. In addition, it can be precoated to minimize migration, for example an alumina and/or silica precoat and/or to improve wetability and uniform distribution of the coating materials on the substrate. Further, the iron oxide component, article can be further coated with a barrier film, organic and/or inorganic to minimize reaction of components such as corrosive gaseous components with the final iron oxide component/article. In order to provide for controlled magnetic properties in the interacting iron oxide coating, it is preferred that the substrate be substantially non-magnetic conductive when the coated substrate is to be used as a component of magnetic type devices. In one embodiment, the substrate is inorganic, for example metal and/or ceramic and/or glass. Although the present process may be employed to coat two dimensional substrates, such as substantially flat surfaces, it has particular applicability in coating three dimensional substrates. Thus, the present process provides substantial process advances as a three dimensional process. Examples of three dimensional substrates which can be coated using the present process include spheres such as having a diameter of from about 1 micron to about 500 microns more preferably from about 10 microns to about 150 microns, extrudates, flakes, single fibers, fiber rovings, chopped fibers, fiber mats, porous substrates, irregularly shaped particles, e.g., catalyst supports, multi-channel monoliths, tubes and the like. The substrate for use in polymer composites can be in the form of a particle type shapes set forth above and/or a body of woven or non-woven fibers, particularly, a body of woven or non-woven fibers having a porosity in the range of about 60% to about 95%. Porosity is defined as the percent or fraction of void space within a body of fibers. The above-noted porosities are calculated based on the fibers including the desired oxide coating.

The conditions at which each of the steps of the present process occur are effective to obtain the desired result from each such step and to provide a substrate coated with an iron oxide-containing coating. The substrate/iron chloride precursor contacting and the substrate/interacting forming component contacting preferably occur at a temperature in the range of about 30° C. to about 450° C., more preferably about 35° C. to about 300° C. The amount of time during which iron chloride precursor and/or interacting-forming component is being deposited on the substrate depends on a number of factors, for example, the desired thickness of the iron oxide-containing coating, the amounts of iron chloride precursor and interacting-forming component available for substrate contacting, the method by which the iron chloride and dopant-forming component are contacted with the substrate and the like. Such amount of time is preferably in the range of about 0.1 or 0.5 minutes to about 20 minutes, more preferably about 0.5 or 1 minute to about 10 minutes.

If the coated substrate is maintained in a substantially non-deleterious oxidizing environment, it is preferred that such maintaining occur at a temperature in the range of about 50° C. to about 450° C., more preferably about 100° C. to about 300° C. for a period of time in the range of about 0.05 or 0.1 minutes to about 20 minutes, more preferably about 0.5 or 1 minute to about 10 minutes. The coated substrate/oxidizing agent contacting preferably occurs at a temperature in the range of about 60° C. to about 1000° C., more preferably about 750° C. to about 900° C., for a period of time in the range of about 0.05 or 0.1 minutes to about 10 minutes. Additional contacting at a higher temperature up to about 850° C. for a period of up to about 0.5 to about 2 hours can be used to fully develop the electrical conductivity properties. A particular advantage of the process of this invention is that the temperatures used for oxidation have been found to be lower, in certain cases, significantly lower, i.e., 50° to 200° C. than the temperatures required for conventional processing. This is very significant and unexpected, provides for process efficiencies and reduces, and in some cases substantially eliminates, migration of deleterious elements from the substrate to the iron oxide layer. Excessive ion migration, e.g., from the substrate, can reduce permeability depending on the substrate and processing condition. In addition, the oxidizing and or sintering steps can be staged with successive reductions in the oxygen content of the gas and/or with a carbon source, to provide the desired oxygen content for developing enhanced magnetic properties.

The pressure existing or maintained during each of these steps may be independently selected from elevated pressures (relative to atmospheric pressure), atmospheric pressure, and reduced pressures (relative to atmospheric pressure). Slightly reduced pressures, e.g., less than atmospheric pressure and greater than about 8 psia and especially greater than about 11 psia, are preferred.

Ferrite is a generic term describing a class of magnetic oxide compounds that contain iron oxide as a major component. There are several crystal structure classes of compounds broadly defined as ferrites, such as spinel, magnetoplumbite, garnet, and perovskite structures.

Although there are many characterizations specific to a given application, one property is shared by all materials designated as ferrites, namely the existence of a spontaneous magnetization (a magnetic induction in the absence of an external magnetic field).

The magnetic properties of ferrites derive directly from the electron configuration of the ions and their interactions with each other. Although the specific structures differ, they can all generally be considered to be composed of two sublattices: a rigid anion lattice composed of the relatively large oxygen anions and the cation sublattice formed by the filling of holes (interstitial sites) with the smaller cations.

Spinel ferrites has the general composition $AB_2X_4$. The structure is a cubic close packing of the Anions (X), with a variety of A and B cations capable of filling the interstitial sites. The smallest crystallographic unit cell which has the required cubic symmetry contains eight formula units of $AB_2X_4$. each unit cell has two types of interstitial sites that can be occupied by the A and B cations.

A wide variety of transition metal cations can fit into these interstitial sites. Thus it becomes possible to make a large number of spinel ferrite compounds, each having specific magnetic interactions.

A great variety of oxide materials form the spinel structure with nickel-zinc-ferrite, $Ni_{1-x}Zn_xFe_{2-5}O_4$, and manganese-zinc-ferrite, $Mn_{1-x}Zn_xFe_{2+5}O_4$, being preferred.

Many of the nickel-zinc-ferrites are formulated with an iron deficiency in order to keep the magnetic losses low and the resistivity high ($>10^{6}$·cm): The manganese-zinc-ferrites, on the other hand, have a slight excess of iron in order to optimize permeability and magnetic saturation.

It is preferred to make cubic spinel ferrite materials which have the highest inductance (high relative permeability) and are relatively easy to magnetize and demagnetize as high frequencies. These materials are used as inductors and high frequency transformers. Materials with the highest permeability are those for which the anisotropy constant $K_1$ is approximately zero and the compositional regions where $K_1$ is very low have been delineated.

In addition to the major crystal chemical interactions, a number of dopants have specific effects on the magnetic properties of spinel ferrites. For example, the addition of small amounts of CaO (0.1 mol %) and $SiO_2$ (0.02 mol %) greatly reduce the eddy current losses in ferrites. Silica effects density, power losses, and microstructure of manganese-zinc-ferrites. Other dopants such as $B_2O_3$, $ZnO_2$ and $TiO_2$ have effects on the temperature coefficient of permeability and permeability disaccommodation.

In addition to the above spinel ferrited hexagonal ferrites are a group of ferromagnetic oxides in which the principal component is $Fe_2O_3$ in combination with a divalent oxide (BaO, SrO, or PbO) and a divalent transition metal oxide (e.g., $BaZn_2Fe_{16}O_{27}$. Most hexagonal ferrite materials are used as permanent magnet materials.

In contrast to the spinel ferrites, where the object is to produce a material with the lowest possible value of the magnetocrystalline anisotropy (typically $0-10_{-11}J/cm_3$ at room temperature) in order to maximize permeability and reduce hysteresis losses, the M-type hexagonal ferrits are useful because of their high anisotropic value (typically $3 \times 10_{-1}J/cm_3$).

The garnets represent another class of compounds having the general structure $M_3Fe_5O_{12}$. The unit cell within the structure there are 24 tetrahedral and 16 octahedral sites. These sites can accommodate the small Fe cation and other cations of similar size. Additionally, there are 24 dodecahedral sites that can accommodate Y, La, Ca, the rare earths, and other large cations.

Again, as was the case with both the hexagonal and spinel ferrites, there are two magnetic sublattice opposed to each other. The wide variety of cations that can be substituted into the lattice allow specific material properties to be engineered. The most widely know magnetic compounds having this structure are yttrium-iron=garnet, $Y_3Fe_5O_{12}(25)$, and gadolinium-iron-garnet, $Gd_3Fe_5O_{12}$.

The iron oxide coated substrate, of the present invention may be, for example a magnetic material itself, a catalyst itself or a component of a composite together with one or more matrix materials. The composites may be such that the matrix material or materials substantially totally encapsulate or surround the coated substrate, or a portion of the coated substrate may extend away from the matrix material or materials.

Any suitable matrix material or materials may be used in a composite with the iron oxide coated substrate. Preferably, the matrix material comprises a polymeric material, e.g., one or more synthetic polymers, more preferably an organic polymeric material. The polymeric material may be either a thermoplastic material or a thermoset material. Among the thermoplastics useful in the present invention are the polyolefins, such as polyethylene, polypropylene, polymethylpentene and mixtures thereof; and poly vinyl polymers, such as polystyrene, polyvinylidene, combinations of polyphenylene oxide and polystyrene, and mixtures thereof. Among the thermoset polymers useful in the present invention are epoxies, phenol-formaldehyde polymers, polyesters, polyvinyl esters, polyurethanes, melamine-formaldehyde polymers, and urea-formaldehyde polymers.

In order to provide enhanced bonding between the iron oxide coated substrate and the matrix material, it has been found that the preferred matrix materials have an increased polarity, as indicated by an increased dipole moment, relative to the polarity of polypropylene. Because of weight and strength considerations, if the matrix material is to be a thermoplastic polymer, it is preferred that the matrix be a polypropylene-based polymer which includes one or more groups effective to increase the polarity of the polymer relative to polypropylene. Additive or additional monomers, such as maleic anhydride, vinyl acetate, acrylic acid, and the like and mixtures thereof, may be included prior to propylene polymerization to give the product propylene-based polymer increased polarity. Hydroxyl groups may also be included in a limited amount, using conventional techniques, to increase the polarity of the final propylene-based polymer.

Thermoset polymers which have increased polarity relative to polypropylene are more preferred for use as the present matrix material. Particularly preferred thermoset polymers include epoxies, phenol-formaldehyde polymers, polyesters, and polyvinyl esters.

Various techniques, such as casting, molding and the like, may be used to at least partially encapsulate or embed the iron oxide coated substrate into the matrix material or materials and form composites. The choice of technique may depend, for example, on the type of matrix material used, the type and form of the substrate used and the specific application involved. One particular embodiment involves pre-impregnating (or combining) that portion of the iron oxide coated substrate to be embedded in the matrix material with a relatively polar (increased polarity relative to polypropylene) thermoplastic polymer, such as polar engineering thermoplastic resins, prior to the coated substrate being embedded in the matrix material. This embodiment is particularly useful when the matrix material is itself a thermoplastic polymer, such as modified polypropylene, and has been found to provide improved bonding between the iron oxide coated substrate and the matrix material.

The bonding between the matrix material and the iron oxide coated substrate is important. In order to provide for improved bonding of the iron oxide coating (on the substrate) with the matrix material, it is preferred to at least partially, more preferably substantially totally, coat the iron oxide coated substrate with a coupling agent which acts to improve the bonding of the iron oxide coating with the matrix. This is particularly useful when the substrate is a ceramic comprises acid resistant glass fibers. Any suitable coupling agent may be employed. Such agents preferably comprise molecules which have both a polar portion and a non-polar portion. Certain materials generally in use as sizing for glass fibers may be used here as a "size" for the iron oxide coated glass fibers. The amount of coupling agent used to coat the iron oxide coated ceramic fibers should be effective to provide the improved bonding noted above and, preferably, is substantially the same as is used to size bare glass fibers. Preferably, the coupling agent is selected from the group consisting of silanes, silane derivatives, stannates, stannate derivatives, titanates, titanate derivatives and mixtures thereof. As set forth below, such composites are particularly useful in antistatic type applications for example, in static dissipation and electro static recording.

In yet another embodiment, a coated substrate including iron oxide, preferably high permeability iron oxide, and at least one additional catalyst component in an amount effective to promote a chemical reaction is formed. Preferably, the additional catalyst component is a metal and/or a component of a metal effective to promote the chemical reaction. The promoting effect of the catalyst component may be enhanced by the presence of a magnetic field in proximity to the component including induction heating of the catalyst. Thus, the iron oxide, preferably on a substantially non-electronically conductive substrate, e.g., a catalyst support, can provide an effective and efficient catalyst for chemical reactions, including those which occur or are enhanced when a magnetic field is applied in proximity to the catalyst component. Thus, it has been found that the present coated substrates are useful as active catalysts and supports for additional catalytic components. Without wishing to limit the invention to any particular theory of operation, it is believed that the outstanding stability, e.g., with respect to properties and/or morphology and/or stability, of the present iron oxides plays an important role in making useful and effective catalyst materials particularly the higher surface area attainable of copper oxide materials prepared in accordance with this invention, especially when compared to prior art sintering processes. Any chemical reaction, including a chemical reaction the rate of which is magnetic field or enhanced as described herein, may be promoted using the present catalyst component iron oxide-containing coated substrates. A particularly useful class of chemical reactions are those involving chemical oxidation or reduction. For example, chemical reactions, e.g., dehydrogenation, such as alcohols to ketones, hydrodecyclization, isomerization, ammoxidation, such as with olefins, aldol condensations using aldehydes and carboxylic acids and the like, may be promoted using the present catalyst component, iron oxide-containing coated substrates. As noted above, the iron oxide in the catalyst component, iron oxide-containing substrates is magnetic. Although magnetic iron oxide itself is particularly useful, other interacting components may be incorporated in the present catalyst materials to provide the iron oxide with the desired magnetic properties. Such interacting components may be incorporated into the final catalyst component, iron oxide-containing coated substrates using one or more processing techniques substantially analogous to procedures useful to incorporate such interacting components, e.g., as described herein.

Particularly useful chemical reactions as set forth above include the oxidative dehydrogenation of ethylbenzene to styrene and 1-butene to 1,3-butadiene; the ammoxidation of propylene to acrylonitrile; aldol condensation reactions for the production of unsaturated acids, i.e., formaldehyde and propionic acid to form methacrylic acid and formaldehyde and acetic acid to form acrylic acids; the isomerization of butenes; and the oxidation of methane to methanol.

The iron oxide-containing coated substrates of the present invention may be employed alone or as a catalyst and/or support in a sensor, in particular gas sensors. Preferably, the coated substrates includes a sensing component similar to the catalyst component, as described herein. The present sensors are useful to sense the presence or concentration of a component, e.g., a gaseous component, of interest in a medium, for example, hydrogen, carbon monoxide, methane and other alkanes, alcohols, aromatics, e.g., benzene, etc., e.g., by providing a signal in response to the presence or concentration of a component of interest, e.g., a gas of interest, in a medium. Such sensors are also useful where the signal provided is enhanced by the presence of an electrical field or current in proximity to the sensing component. The sensing component is preferably one or more metals or metallic containing sensing components, for example, platinum, palladium, silver and iron. The signal provided may be the result of the component of interest itself impacting the sensing component and/or it may be the result of the component of interest being chemically reacted, e.g., oxidized or reduced, in the presence of the sensing component.

The stability and durability for the present particularly useful iron oxide materials are believed to make them very useful as catalysts, sensors.

Any suitable catalyst component (or sensing component) may be employed, provided that it functions as described herein. Among the useful metal catalytic components and metal sensing components are those selected from components of the transition metals, the rare earth metals, certain other catalytic components and mixtures thereof, in particular catalysts containing gold, silver, copper, vanadium, chromium, tungsten, iron, indium, antimony, the platinum group metals, i.e., platinum, palladium, iron, nickel, manganese, cesium, titanium, etc. Although metal containing compounds may be employed, it is preferred that the metal catalyst component (and/or metal sensing component) included with the coated substrate comprise elemental metal and/or metal in one or more active oxidized forms, for example, $Cr_2O_3$, $Ag_2O$, $Sb_2O_4$, etc.

The preferred support materials include a wide variety of materials used to support catalytic species, particularly porous refractory inorganic oxides. These supports include, for example, alumina, silica, zirconia, magnesia, boria, phosphate, titania, ceria, thoria and the like, as well as multi-oxide type supports such as alumina-phosphorous oxide, silica alumina, zeolite modified inorganic oxides, e.g., silica alumina, and the like. As set forth above, support materials can be in many forms and shapes, especially porous shapes which are not flat surfaces, i.e., non line-of-site materials. A particularly useful catalyst support is a multi-channel monoliths such as one made from corderite which has been coated with alumina. The catalyst materials can be used as is or further processed such as by sintering of powdered catalyst materials into larger aggregates. The aggregates can incorporate other powders, for example, other oxides, to form the aggregates.

The catalyst components (or sensing components) may be included with the coated substrate using any one or more of various techniques, e.g., conventional and well known techniques. For example, metal catalyst components (metal sensing components) can be included with the coated substrate by impregnation; electrochemical deposition; spray hydrolysis; deposition from a molten salt mixture; thermal decomposition of a metal compound or the like. The amount of catalyst component (or sensing component) included is sufficient to perform the desired catalytic (or sensing function), respectively, and varies from application to application. In one embodiment, the catalyst component (or sensing component) is incorporated while the iron oxide forming component is placed on the substrate. Thus, a catalyst material, such as a salt or acid, e.g., a halide and preferably chloride, oxy chloride and chloro acids, e.g., chloro platinic acid, of the catalytic metal, is incorporated into the iron chloride-precursor containing coating of the substrate, prior to contact with the oxidizing agent, as described herein. This catalyst material can be combined with the iron chloride-precursor and contacted with the substrate, or it may be contacted with the substrate separately from iron chloride-precursor before, during and/or after the iron chloride-precursor/substrate contacting.

The preferred approach is to incorporate catalyst-forming materials into a process step used to form a iron oxide coating. This minimizes the number of process steps but also, in certain cases, produces more effective catalysts. The choice of approach is dependent on a number of factors, including the process compatibility of iron oxide and catalyst-forming materials under given process conditions and the overall process efficiency and catalyst effectiveness.

A particularly unique property of the catalysts of this invention is the ability to be able to separate and recover catalyst from solution and/or other non-magnetic or low permeability solids by magnetic separation. This is particularly advantageous in slurry catalysts, such as in liquid systems, such as hydrocarbon and/or aqueous and/or combination systems. This property allows separation including separation from other non-magnetic solids and separate catalysts regeneration if required.

Another unique property is the ability to heat the catalyst by induction heating as more fully described below. This property allows for far superior temperature control and thermal efficiencies.

In addition, the ability to vary coating thickness and substrate composition allows designing catalyst for a given density, a feature important in gravity separation processes.

The iron oxide/substrate combinations, e.g., the iron oxide coated substrates, of the present invention are useful in other applications as well.

The applications for the spinel ferrites can be grouped into several main categories: main cores, and linear, power, and recording-head applications.

Magnetic-core memories are based on switching small toroidal cores of spinel ferrite between two stable magnetic states. Such core memories are used in applications where ruggedness and reliability are necessary, e.g., military applications.

The linear or low signal applications are those in which the magnetic field in the ferrite is well below the saturation level and the relative magnetic permeability can be considered constant over the operating conditions.

The manganese-zinc-ferrite materials characteristically have higher relative permeabilities, higher saturation magnetization, lower losses, and lower resistivities. Since the ferromagnetic resonance frequency is directly related to the permeability, the usual area of application is below 2 MHz.

At low signal levels, ferrite cores are used as transformers, low frequency and pulse transformers, or low energy inductors. As inductors, the manganese-zinc-ferrites find numerous applications in the design of telecommunications equipment where they must provide a specific inductance over specific frequency and temperature ranges. Nickel-zinc-ferrites with lower saturation magnetization, generally lower relative magnetic permeabilities, and lower resistivities ($10^6$·cm), produce ferromagnetic resonance effects at much higher frequencies than the manganese-zinc-ferrites. They find particular application at frequencies from 2 to 70 MHz (46).

By adjustment of the nickel-zinc ratio it is possible to prepare a series of materials covering the relative permeability range of 10–2000. These materials are used as high frequency inductors, antenna rods, high frequency power transformers, and pulse transformers. A variety of materials have been developed to serve these applications.

The lower magnetic losses of ferrite materials and its higher resistance (10 ohm·cm) compared with laminated transformer steel permits ferrite cores to be used as the transformer element in high frequency power supplies. Commonly known as switched-mode power supplies, they operate at a frequency of 15–30 kHz and offer higher efficiencies and smaller size than comparable laminated steel transformers.

Television and audio applications include yoke rings for the deflection coils for television picture tubes, flyback transformers, and various convergence and pincushion distortion corrections as well as antenna rods.

Manganese-zinc and nickel-zinc-spinel ferrites are used in magnetic recording heads for duplicating magnetic tapes and the recording of digital information. Most recording heads are fabricated from polycrystalline nickel-zinc-ferrite for operating frequencies of 100 kHz to 2.5 GHz.

The unique properties of hexagonal ferrites are low density, and high coercive force.

The ceramic magnet can be used in d-c permanent magnet motors, especially in automotive applications, such window life, flower, and windshield-wiper motors.

Other grades of barium and strontium ferrite material have been developed for similar applications.

Other applications of hexagonal ferrites are in loudspeakers. Hexagonal ferrites are used in self-resonant isolators where the strong magnetocrystalline anisotropy permits a resonator without large d-c magnetic biasing fields.

Hexagonal ferrites are also used as magnetic biasing components in magnetic bubble memories. porous membranes, resistance heating elements, electrostatic dissipation and recording elements, and electromagnetic interference shielding elements.

In one embodiment, a porous membrane is provided which comprises a porous substrate, preferably an inorganic substrate, and a iron oxide-containing material in contact with at least a portion of the porous substrate. In another embodiment, the porous membrane comprises a porous organic matrix material, e.g., a porous polymeric matrix material, and a iron oxide-containing material in contact with at least a portion of the porous organic matrix material. With the organic matrix material, the iron oxide-containing material may be present in the form of an inorganic substrate, porous or substantially non porous, having a iron oxide-containing coating, e.g., an magnetic iron oxide-containing coating, thereon.

One particularly useful feature of the present porous membranes is the ability to control the amount of iron oxide present to provide for enhanced performance in a specific application, e.g., a specific contacting process. For example, the thickness of the iron oxide-containing coating can be controlled to provide such enhanced performance. The coating process of the present invention is particularly advantageous in providing such controlled coating thickness. Also, the thickness of the iron oxide-containing coating can be varied, e.g., over different areas of the same porous membrane, such as an asymmetric porous membrane. In fact, the thickness of this coating can effect the size, e.g., diameter, of the pores. The size of the pores of the membrane or porous substrate may vary inversely with the thickness of the coating. The coating process of the present invention is particularly useful in providing this porosity control.

A heating element, for example, an induction heating element, is provided which comprises a three dimensional substrate having a magnetic iron oxide-containing coating on at least a portion of all three dimensions thereof. The coated substrate is adapted and structured to provide heat in response, that is, in direct or indirect response, to the presence or application of one or more force fields, for example, magnetic fields, and the like, therein or thereto. An example of such a heating element is one which is adapted and structured to provide heat upon the application of a magnetic field. Heating elements which are adapted and structured to provide heat in response to the presence of one or more magnetic fields therein are included in the scope of the present invention. In one embodiment, a flexible heating element is provided which comprises a flexible matrix material, e.g., an organic polymeric material as set forth above in contact with a substrate having an magnetic iron oxide-containing coating on at least a portion thereof. The coated substrate is adapted and structured as described above.

In addition, an electrostatic dissipation/recording, electromagnetic interference shielding element is provided which comprises a three dimensional substrate, e.g., an inorganic substrate, having an electronically conductive iron oxide-containing coating on at least a portion of all three dimensions thereof. The coated substrate is adapted and structured to provide at least one of the following: electrostatic dissipation or recording and/or electromagnetic interference shielding.

A very useful application for the products of this invention is for static, for example, electrostatic, dissipation or recording and shielding, particularly for ceramic and polymeric parts, and more particularly as a means for effecting static dissipation including controlled static charge and/or dissipation in such as parts made of ceramics and polymers and the like, as described herein. The present products can be incorporated directly into the polymer or ceramic and/or a carrier such as a cured or uncured polymer based carrier or other liquid, as for example in the form of a liquid, paste, hot melt, film and the like. These product/carrier based materials can be directly applied to parts to be treated to improve overall performance effectiveness. A heating cycle is generally used to provide for product bonding to the parts. In addition, the products of this invention can be used in molding processes to allow for enhanced static dissipation and/or shielding properties of polymeric resins relative to an article or device or part without such product or products, and/or to have a preferential distribution of the product or products at the surface of the part for greater volume effectiveness within the part.

The particular form of the products, i.e., fibers, flakes, particles, mats or the like, is chosen based upon the particular requirements of the part and its application, with one or more of flakes, fibers and particles, including spheres, being preferred for polymeric parts. In general, it is preferred that the products of the invention have a largest dimension, for example, the length of fiber or particle or side of a flake, of less than about ⅛ inch, more preferably less than about 1/64 inch and still more preferably less than about 1/128 inch. It is preferred that the ratio of the longest dimension, for example, length, side or diameter, to the shortest dimension of the products of the present invention be in the range of about 500 to 1 to about 10 to 1, more preferably about 250 to 1 to about 25 to 1. The concentration of such product or products in the product/carrier and/or mix is preferably less than about 60 weight %, more preferably less than about 40 weight %, and still more preferably less than about 20 weight %. A particularly useful concentration is that which provides the desired performance while minimizing the concentration of product in the final article, device or part.

The products of this invention find particular advantage in static dissipation parts, for example, parts having a surface resistivity in the range of about $10^4$ ohms/square to about $10^{12}$ ohms/square. In addition, those parts generally requiring shielding to a surface resistivity in the range of about 1 ohm/square to about $10^5$ ohms/square and higher find a significant advantage for the above products due to their mechanical properties and overall improved polymer compatibility, for example, matrix bonding properties as compared to difficult to bond metal and carbon-based materials.

A flexible electrostatic dissipation/recording/electromagnetic interference shielding element is also included in the scope of the present invention. This flexible element comprises a flexible matrix material, e.g., an organic polymeric material, in contact with a substrate having an electronically conductive iron oxide-containing coating on at least a portion thereof. The coated substrate of this flexible element is adapted and structured as described above.

The present coating process is particularly suitable for controlling the composition and structure of the coating on the substrate to enhance the performance of the coated substrate in a given, specific application, e.g., a specific resistance heating electrostatic dissipation, recording or electromagnetic interference shielding application.

The present iron oxide/substrate combinations and matrix material/iron oxide/substrate combinations, which have at least some degree of porosity, hereinafter referred to as "porous contacting membranes" or "porous membranes", may be employed as active components and/or as supports for active components in systems in which the iron oxide/substrate, e.g., the iron oxide coated substrate, is contacted with one or more other components such as in, for example, separation systems, gas and particulate purification systems, filter medium systems, flocculent systems and other systems in which the magnetic properties stability and durability of such combinations can be advantageously utilized.

Particular applications which combine many of the outstanding properties of the products of the present invention include porous and magnetic membrane separations for solids processing, liquids processing, gas processing, food processing, chemical processing, and bio medical processing. For example, various types of solutions can be further concentrated. The separation system can be used in flat plate, tubular and/or spiral wound system design.

Membranes containing voids that are large in comparison with molecular dimensions are considered porous. In these porous membranes, the pores are interconnected, and the membrane may comprise only a few percent of the total volume. Transport, whether driven by pressure, concentration, or electrical potential or magnetic field, occurs within these pores. Many of the transport characteristics of porous membranes are determined by the pore structure, with selectivity being governed primarily by the relative size of the molecules or particles involved in a particular application compared to the membrane pores. Mechanical properties and chemical resistance are greatly affected by the nature, composition and structure e.g., chemical composition and physical state, of the membrane.

Commercial micropore membranes have pore dimensions, e.g., diameters, in the range of about 0.005 micron to about 20 microns. They are made from a wide variety of materials in order to provide a range of chemical and solvent resistances. Some are fiber or fabric reinforced to obtain the required mechanical rigidity and strength. The operational characteristics of the membrane are defined sometimes in terms of the molecules or particles that will pass through the membrane pore structure.

Microporous membranes are often used as filters. Those with relatively large pores are used in separating coarse disperse, suspended substances, such as particulate contamination. Membranes with smaller pores are used for sterile filtration of gases, separation of aerosols, and sterile filtration of pharmaceutical, biological, and heat sensitive solutions. The very finest membranes may be used to separate, e.g., purify, soluble macromolecular compounds.

Porous membranes also are used in dialysis applications such a removing waste from human blood (hemodialysis), for separation of biopolymers, e.g., with molecular weights in the range of about 10,000 to about 100,000, and for the analytical measurements of polymer molecular weights. Microporous membranes also may be used as supports for very thin, dense skins or a containers for liquid membranes.

The ability of dense membranes to transport species selectively makes possible molecular separation processes such as desalination of water or gas purification, but with normal thicknesses these rates are extremely slow. In principle, the membranes could be made thin enough that the rates would be attractive, but such thin membranes would be very difficult to form and to handle, and they would have difficulty supporting the stresses imposed by the application. Conversely, microporous membranes have high transport rates but very poor selectivity for small molecules. Asymmetric membranes, for example made of the present combinations, in which a very thin, dense membrane is placed in series with a porous substructure are durable and provide high rates with high selectivity. Such asymmetric membranes and the use thereof are within the scope of the present invention.

Examples of applications for porous membranes include: separation of fungal biomass in tertiary oil recovery; concentration of PVC latex dispersions; desalination of sea water; enhancement of catecholamine determination; removal of colloids from high purity deionized water; treatment of wool scouring liquids; filtration of tissue homogenates; separation of antigen from antigen-antibody couple in immunoassay; purification of subcutaneous tissue liquid extracts; concentration of solubilized proteins and other cellular products; cell debris removal; concentration of microbial suspensions (microbial harvesting); enzyme recovery; hemodialysis; removal of casein, fats and lactose from whey; concentration of albumen; separation of skimmed milk; clarification of liqueur, fruit juices, sugar, and corn syrup; alcohol fermentation; sterilization of liquids, e.g., beer, wine; continuous microfiltration of vinegar; concentration and demineralization of cheese, whey, soy whey, vegetable extracts, and flavorings; sugar waste recovery; silver recovery from photo rinses; dewatering of hazardous wastes; removal of hydrocarbon oils from waste water; recovery and recycling of sewage effluent; recovery of dye stuffs from textile mill wastes; recovery of starch and proteins from factory waste, wood pulp, and paper processing; separation of water and oil emulsions; separation of carbon dioxide and methane; and catalytic chemical reactions.

As described above porous membranes can be used in a wide variety of contacting systems. In a number of applications, the porous membrane provides one or more process functions including: filtration, separation, purification, recovery of one or more components, emulsion breaking, demisting, flocculation, resistance heating and chemical reaction (catalytic or noncatalytic), e.g., pollutant destruction to a non-hazardous form. The resistance heating and chemical reaction functions (applications) set forth herein can be combined with one or more other functions set forth herein for the porous membranes as well as such other related porous membrane applications.

The porous membrane, in particular the substrate, can be predominately organic or inorganic, with an inorganic substrate being suitable for more demanding process environments. Depending upon the application, the iron oxide film can be provided with a barrier coating on its surface to minimize and/or reduce substantial detrimental outside environmental effects and/or conditions on the iron oxide surface. The porous organic-containing membranes often include a porous organic based polymer matrix material having incorporated therein a three dimensional iron oxide-containing material, preferably including an magnetic iron dioxide coating, more preferably incorporating a additional interacting component and/or a catalytic species, in an amount that provides the desired function, particularly high permeability, without substantially deleteriously affecting the properties of the organic polymer matrix material. These modified polymer membranes are particularly useful in porous membrane and/or magnetic separation and/or magneticsusceptable material and/or catalytic processes.

Examples of polymer materials useful in microporous membranes include cellulose esters, poly(vinyl chloride), high temperature aromatic polymers, polytetrafluoroethylene, polymers sold by E. I. DuPont Corporation under the trademark Nafion, polyethylene, polypropylene, polystyrene, polyethylene, polycarbonate, nylon, silicone rubber, and asymmetric coated polysulfone fiber.

A very convenient application for the coating process and products of this invention is the production of a controlled coating, e.g., a thin coating of iron oxide-containing material, on an inorganic substrate, particularly a porous inorganic substrate, to produce a porous membrane. The process provides a new generation of membranes: porous membranes for contacting processes, e.g., as described herein. The selectivity in filtration, particularly ultra and micro filtration, can also be enhanced by applying an magnetic field with magnetic susceptible material. The magnetic field can be obtained using a membrane including a magnetic iron oxide-containing coated substrate.

Porous multilayer asymmetric electrically inorganic membranes, produced in accordance with this invention, are particularly advantageous for membrane applications. Among the advantages of such membranes are: stability at high temperature and/or at large pressure gradients, mechanical stability (reduced and even substantially no compaction of the membrane under pressure), stability against microbiological attack, chemical stability especially with organic solvents, steam sterilization at high temperatures, backflush cleaning at pressures of up to 25 atm, and stability in corrosive and oxidation environment.

A membrane can be classified as a function of the size of the particles, macromolecules and molecules separated. Micron sized porous ceramics for filtration processes can be prepared through sintering of appropriate materials as set forth herein for the manufacture of sensors. However, the preferred process for membrane-based microfiltration, ultrafiltration and reverse osmosis is to provide inorganic layers with ultrafine pores and thickness small enough to obtain high flux through the membrane, particularly membranes including iron oxide-containing coatings.

With this type of asymmetric membrane, separation processes are pressure driven. Another factor is the interaction at the membrane interface between the porous material and the material to be processed. As noted above, selectivity can be enhanced by applying an magnetic field onto the surface of the membrane particularly with magnetic susceptible materials. Such porous membranes can be obtained with one or more magnetic iron oxide-containing thin layers on a porous substrate. Conductive iron oxide combined with other metal oxide mixtures also provide improved properties for porous membranes and can exhibit magnetic and electronic conductivity, as well as other functions, such as catalysis or resistance heating.

As set forth above, porous membranes with inorganic materials can be obtained through powder agglomeration, the pores being the intergranular spaces. Conflicting requirements such as high flow rate and mechanical stability can be achieved using an asymmetric structure. Thus, an inorganic porous membrane is obtained by superimposing a thin microporous film, which has a separative function, over a thick macroporous support. For example, conductive iron oxide coating onto the surface of filter media can be used as well as onto the surface of flat circular alumina plates. Coated alumina membranes supported on the inner part of sintered alumina tubes designed for industrial ultrafiltration processes can be used. Tube-shaped supports can be used with varying different chemical compositions, such as oxides, carbides, and clays. Coating of a homogeneous and microporous iron oxide-containing layer depends on surface homogeneity of the support and on adherence between the membrane and its support. Superior results can be obtained with particulate alumina. The inner part of the tube has a membrane comprising a layer, e.g., in the range of about 10 to about 20 microns thick, with pores, e.g., having diameters in the range of about 0.02 to about 0.2 microns sized for microfiltration purposes. The main feature of such a membrane is uniform surface homogeneity allowing for the iron oxide-containing coating to be very thin, e.g., less than about one micron in thickness.

The products of this invention, as described herein, are particularly useful for resistance heating applications. It has been found that the coated three dimensional and/or flexible substrates particularly fibers, flakes, particles, including spheres, fiber rovings, chopped fibers, and fiber mats, can be incorporated into polymeric matrix materials, particularly thermoplastic, thermoset and rubber based polymeric materials, as described herein. The iron oxide coated substrates can be, for example, E, C, S, or T glass, silica, silica alumina, silica alumina boria, silicon carbide or alumina fibers, rovings, mats, chopped mats, etc. What is unexpected is the improved mechanical properties, e.g., strength, coating adhesion and the like, of the coated substrates relative to the prior art substrates coated using spray pyrolysis techniques and the improved control over coating thickness to match magnetic requirements for a given heating application. Whereas for many low to moderate temperature applications, organic polymer matrix materials are preferred, three dimensional products comprising, preferably primarily comprising flexible or rigid inorganic substrates coated with iron oxide-containing coatings have excellent high temperature performance characteristics useful, for example, in high temperature induction heating of liquids and gases, such as air, by contact with or through (i.e., porous) such three dimensional products, including multi-channel monoliths. Typical induction heating applications include: the curing and bonding of polymeric composites.

A very useful application for the products of this invention is for the joining of parts, particularly polymeric parts, and as a means for effecting the sintering or curing of parts, such as ceramics, curable polymers, for example thermoset and rubber based polymers and the like. The products can be incorporated directly into the polymer or ceramic and/or a carrier such as a cured or uncured polymer based carrier or other liquid, as for example in the form of a liquid, paste, hot melt, film and the like. These product/carrier based materials can be directly applied to parts to be joined and induction heating particularly induction heating used to raise the temperature and bond the parts together at a joint such as through polymer melting and/or curing. A particular unexpected advantage is the improved mechanical properties, especially compared to metallic susceptors which may compromise mechanical properties. In addition, the products of this invention can be used in molding processes to preferentially allow the rapid heating and curing of polymeric resins, and/or to have a preferential distribution of the products at the surface of the parts for subsequent joining of parts. The particular form of the products, i.e., fibers, flakes, particles, mats or the like, is chosen based upon the particular requirements of the part and its application, with one or more of flakes, fibers and particles being preferred for joining or bonding parts. In general, it is preferred that the products of the invention have a largest dimension, for example the length of a fiber or side of a flake, of less than about ⅛ inch, more preferably less than about 1/64 inch and still more preferably less than about 1/128 inch. The concentration of such product or products in the product/carrier and/or mix is preferably less than about 50 weight %, more preferably less than about 20 weight %, and still more preferably less than about 10 weight %. A particularly useful concentration is that which provides the desired heating while minimizing the concentration of product in the final part.

A particularly unique application that relies upon stable electronic conductivity and the physical durability of the products of this invention are dispersions of conductive material, such as powders, in fluids, e.g., hydrocarbons, e.g., mineral or synthetic oils, whereby an increase in viscosity, to even solidification, is obtained when a magnetic field is applied to the system. These fluids are referred to as "field dependent" fluids which congeal and which can withstand forces of shear, tension and compression. These fluids revert to a liquid state when the magnetic field is turned off. Applications include dampening, e.g., shock absorbers, particularly for heavy duty cycling applications.

Certain of these and other aspects the present invention are set forth in the following description of the accompanying drawing.

BRIEF DESCRIPTION OF THE DRAWINGS

FIG. 1 is a block flow diagram illustrating a process for producing the present coated substrates.

FIG. 6 is a detailed, somewhat schematic illustration of a further embodiment of the heating element of the present invention.

DETAILED DESCRIPTION OF THE DRAWINGS

Figure 2:
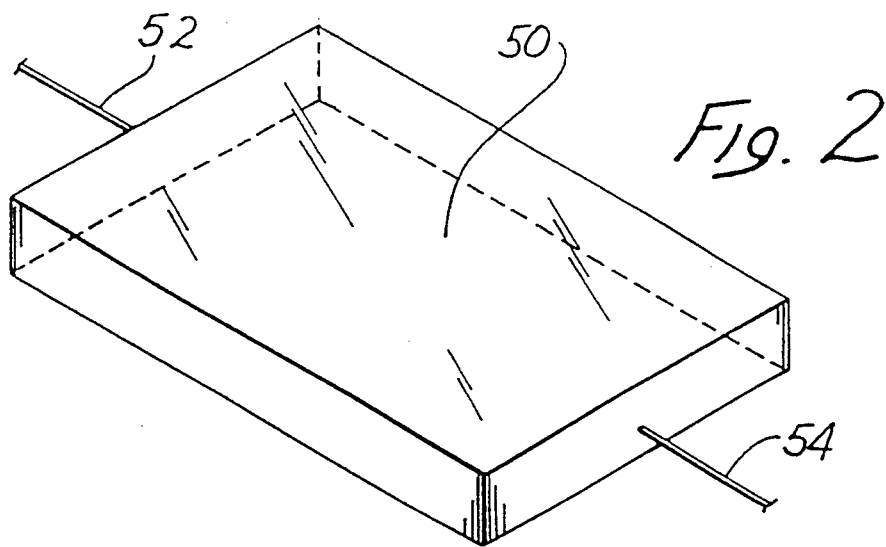
FIG. 2 is a schematic illustration showing an embodiment of the resistance heating element of the present invention.

The following description specifically involves the coating of randomly oriented, non-woven mats of alumina silica fibers. However, it should be noted that substantially the same process steps can be used to coat other substrate forms and/or materials, such as ceramic fibers and mats.

A process system according to the present invention, shown generally at 10, includes a preheat section 12, a coating section 14, an equilibration section 16 and an oxidation/sintering section 18. Each of these sections is in fluid communication with the others. Preferably, each of these sections is a separate processing zone or section.

First gas curtain 20 and second gas curtain 22 provide inert gas, preferably nitrogen, at the points indicated, and, thereby effectively insure that preheat section 12, coating section 14 and equilibrium section 16 are maintained in a substantially inert environment and/or a substantial non-deleterious oxygen environment. First exhaust 24 and second exhaust 26 are provided to allow vapors to exit or be vented from process system 10.

Randomly oriented non-woven mats of silica alumina fibers from substrate source 28 are fed to preheat section 12 where the mats are preheated up to a maximum of 375° C. for a time of 1 to 3 minutes at atmospheric pressure to reach thermal equilibrium. These mats are composed of from 5 micron to about 35 micron diameter silica alumina randomly oriented or woven fibers. The mats are up to 42 inches wide and between 0.058 to 0.174 mil thick. The mats are fed to process system 10 at the rate of about 1 to 5 feet per minute so that the fiber weight throughout is about 0.141 to about 2.1 pounds per minute.

The preheated mats pass to the coating section 14 where the mats are contacted with an anhydrous mixture from raw material source 30. This contacting effects a coating of this mixture on the mats.

This contacting may occur in a number of different ways. For example, the ferric chloride hexahydrate can be combined with nitrogen to form a vapor which is at a temperature of from about 25° C. to about 150° C. higher than the temperature of the mats in the coating section 14. As this vapor is brought into contact with the mats, the temperature differential between the mats and the vapor and the amount of the mixture in the vapor are such as to cause controlled amounts of ferric chloride hexahydrate to condense on and coat the mats.

Another approach is to apply the ferric chloride and interacting compound for example manganese dichloride tetra hydrate and zinc chloride (liquid and/or colloidal suspension of particles) in a molten form directly to the mats in an inert atmosphere. There are several alternatives for continuously applying the molten mixture to the mats. Obtaining substantially uniform distribution of the mixture on the mats is a key objective. For example, the mats can be compressed between two rollers that are continuously coated with the molten mixture. Another option is to spray the molten mixture onto the mats. The fiber mats may also be dipped directly into the melt. The dipped fiber mats may be subjected to a compression roller step, a vertical lift step and/or a vacuum filtration step to remove excess molten mixture from the fiber mats.

An additional alternative is to apply the $FeCl_3$ or mixture in an organic solvent. The solvent is then evaporated, leaving a substantially uniform coating on the fiber mats. The solvent needs to be substantially non-reactive (at the conditions of the present process) and provide for substantial solubility of $FeCl_3$. For example, the dipping solution involved should preferably be at least about 0.1 molar in $FeCl_3$. Substantially anhydrous solvents comprising benzene, acetonitrile, ethyl acetate, acetone, propylene carbonate and mixtures thereof are suitable. Although the interacting compound may be introduced in the sintering section 18, it is preferred to incorporate the interacting compound in the coating section 14 or the equilibration section 16, more preferably the coating section 14.

Any part of process system 10 that is exposed to $FeCl_3$ or its hexahydrate melt or vapor is preferably corrosion resistant, more preferably lined with inert refractory material.

In any event, the mats in the coating section 14 are at a temperature of up to about 450° C., preferable up to about 300° C. and this section can be operated at slightly less than atmospheric pressure. If the $FeCl_3$ coating is applied as a molten melt in a solvent between compression rollers, it is preferred that such compression rollers remain in contact with the fiber mats for about 0.1 to about 2 minutes, more preferably about 1 to about 2 minutes.

After the iron chloride precursor coating is applied to the fiber mats, the fiber mats are passed to the equilibration section 16. Here, the coated fiber mats are maintained, preferably at a higher temperature than in coating section 14, in a substantially inert and/or non-deleterious oxygen environment atmosphere for a period of time, preferably up to about 10 minutes, to allow the coating to more uniformly distribute over the fibers. In addition, if the interacting component is introduced onto the fiber mats separate from the ferric chloride or its hydrate, the time the coated fiber mats spend in the equilibration section 16 results in such component becoming more uniformly dispersed or distributed throughout the ferric chloride coating. Further, it is preferred that any vapor and/or liquid which separate from the coated fiber mats if any in the equilibration section 16 be transferred back and used in the coating section 14. This preferred option, illustrated schematically in FIG. 1 by lines 32 (for the vapor) and 34 (for the liquid) increases the effective overall utilization of ferric chloride precursor in the process so that losses of these components, as well as other materials such as solvents, are reduced.

The coated fiber mats are passed from the equilibration zone 16 into the sintering zone 18 where such fiber mats are contacted with an oxidizer, such as an oxygen-containing gas, from line 36. The oxidizer preferably comprises a mixture of air and rate accelerating quantities of water vapor, if necessary. This mixture is contacted with the coated fiber mats at atmospheric pressure at a temperature of about 600° C. to about 1000° C. for up to about 10 minutes, optionally followed by a temperature up to about 850° C.-optionally in the presence of staged dilute oxygen and/or a carbon and/or source. Such contacting results in converting the coating on the fiber mats to a magnetic iron dioxide coating. The magnetic iron oxide coated fiber mats product, which exits sintering section 18 via line 38, has useful magnetic properties. This product preferably has an iron oxide coating having a thickness in the range of about 0.5 microns to about 100 microns, and is particularly useful as a component in magnetic applications.

Preferably, the product is substantially free of metals contamination which is detrimental to magnetic properties.

The present process provides substantial benefits. For example, the product obtained has manganese, zinc, iron oxide coating which has useful properties, e.g., outstanding magnetic and/or morphological properties. This product may be employed in combination with a metallic catalyst to promote chemical reactions, e.g., chemical oxidation or in combination with separation processes. High utilization of ferric chloride and interacting components is achieved. In addition, high coating deposition and product throughput rates are obtained. Moreover, less rigorous conditions are employed. For example, temperatures within sintering section 18 can be significantly less than 1100° C. to 1500° C. used in conventional processes. The product obtained has excellent stability and durability.

Figure 3:
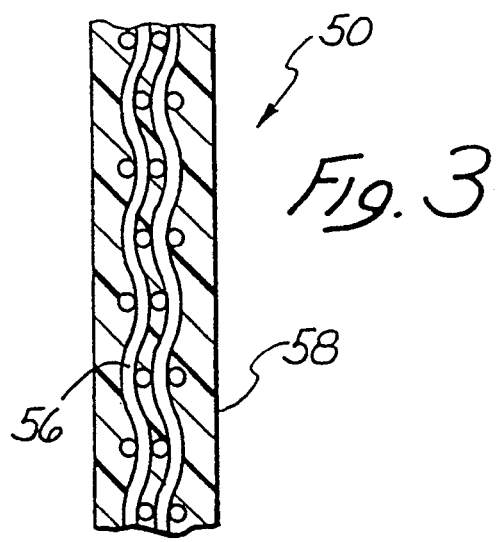
FIG. 3 is a detailed, somewhat schematic illustration of a portion of the resistance heating element shown in FIG. 2.
Figure 4:
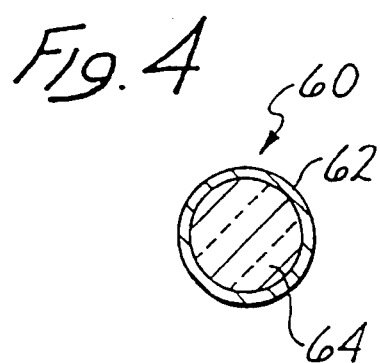
FIG. 4 is a blown-up, cross-sectional view of an individual coated fiber of the coated substrate shown in FIG. 3.

In FIG. 2, a rigid heating element 50 is shown. Element 50 is schematically shown in induction relating relationship to coils 52 and 54 so that a field (magnetic) can be applied across element 50, in particular across the coated substrate 56 of element 50. Referring to FIG. 3, element 50 is a flexible composite of a coated substrate 56 and a flexible, thermoplastic organic polymeric material 58. Coated substrate 56 is in the form of a ceramic fiber roving, a three dimensional substrate, and provides an magnetic susceptible network in element 50. As shown in FIG. 4, the individual coated fibers, illustrated by coated fiber 60, of coated substrate 56, are coated with a coating containing magnetic iron oxide, illustrated by coating 62 on ceramic fiber 64.

Figure 5:
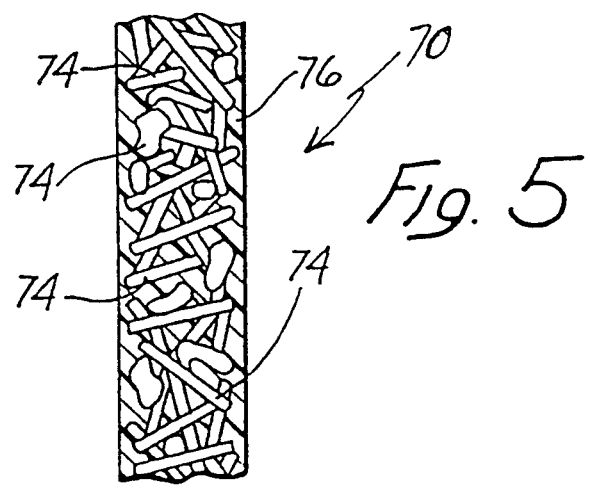
FIG. 5 is a detailed, somewhat schematic illustration of an alternate embodiment of the resistance heating element of the present invention.

Referring to FIG. 5, an alternate heating element 70 is shown. Alternate element 70 can be used in place of element 50 in FIG. 2. Alternate element 70 is a flexible composite of coated substrate particles 74 oriented to provide a magnetic susceptible network in alternate element 70, and a flexible, thermoplastic polymeric matrix material 76. Coated substrate particles 74 are three dimensional particles of various sizes and shapes and are coated with a coating containing magnetic iron oxide. In cross section, each of these particles 74 looks much like individual fiber 60 in FIG. 4.

In FIG. 6, a further heating element 80 is shown. Further element 80 is shown in contact with electrical wire 82 which runs along the underside of element 80. Further element has substantially the same structure as element 50. As alternating electrical current is passed through electrical wire 82, and an alternating magnetic field is created in further element 80. This field gives rise to small scale current loops, known as eddy currents which act to heat the further element 80 resistively. The configuration shown in FIG. 6 is one embodiment of an inductive heating element in accordance with the present invention.

EXAMPLE 1

A substrate made of alumina carbide was contacted with a powder mixture containing ferric chloride, hexahydrate manganese dichloride, tetra hydrate and zinc chloride in a mole ratio to produce manganese, zinc ferrite, $Mn1-xZn xFe_{2+6}O_4$. This contacting occurred at ambient temperature in an air atmosphere at about atmospheric pressure and resulted in a coating being placed on the substrate.

This coated substrate was then heated to 285° C. and allowed to stand in an argon atmosphere at about atmospheric pressure for about 5 minutes. The coated substrate was then fired at 900° C. for 30 minutes using flowing, at the rate of one (1) liter per minute, water saturated air at about atmospheric pressure followed by 1 hour sintering at 1000° C. This resulted in a substrate having a ferrite coating with excellent magnetic properties.

The present methods and products, illustrated above, provide outstanding advantages. For example, the iron oxide coated substrate prepared in accordance with the present invention have improved, i.e., magnetic properties and offer significant design for a wide variety of applications.

EXAMPLE 2

The powder of example 1 is applied to a 26 inch by 26 inch silica fiber non woven mat in the form of a powder (10 to 125 microns in average particle diameter) shaken from a powder spreading apparatus positioned 2 to about 5 feet above the mat. An amount of indium mono chloride powder (3 to about 70 microns in average particle diameter) is added directly to the ferric chloride powder to provide the requisite stoichiometry for the final iron oxide product. The powder-containing mat is placed into a coating furnace chamber at 285° C. and maintained at this temperature for approximately 20 minutes. During this time a downflow of 9.0 liters per minute of nitrogen heated to 350° C. to 450° C. is maintained in the chamber.

In the coating chamber the chloride powder melts and wicks along the fiber to form a uniform coating. In addition, a small cloud of metal chloride vapor can form above the mat. This is due to a small refluxing action in which hot chloride vapors rise slightly and are then forced back down into the mat for coating and distribution by the nitrogen downflow. This wicking and/or refluxing is believed to aid in the uniform distribution of iron chlorides in the coating chamber.

The mat is then moved into the oxidation chamber. The oxidation step occurs in a molecular oxygen-containing atmosphere at a temperature of 900° C. for a period of time of 30 minutes followed by increasing the temperature to 1000° for a period of time of from 10 to 1 hour. The mat may be coated by this process more than once to achieve thicker coatings.

EXAMPLE 3

Example 2 is repeated except that the powder is applied to the mat using a powder sprayer which includes a canister for fluidizing the powder and provides for direct injection of the powder into a spray gun. The powder is then sprayed directly on the mat, resulting in a highly uniform powder distribution.

EXAMPLE 4

Example 2 is repeated except that the powder is applied to the mat by pulling the mat through a fluidized bed of the powder, which as an average particle diameter of about 5 to about 125 microns.

EXAMPLE 5 to 7

Examples 2, 3 and 4 are repeated except that, prior to contacting with the powder, the mat is charged by passing electrostatically charged air over the mat. The powder particles are charged with an opposite charge to that of the mat. The use of oppositely charged mat and powder acts to assist or enhance the adherence of the powder to the mat.

In each of the Examples 2 to 7, the final coated product included an effective iron oxide-containing coating having a substantial degree of uniformity.

While this invention has been described with respect to various specific examples and embodiments, it is to be understood that the invention is not limited thereto and that it can be variously practiced within the scope of the following claims.

What is claimed is:

1. An article comprising a three dimensional inorganic substrate other than magnetic or electrically conductive iron oxide having at least one coating containing magnetic or electrically conductive iron oxide on at least a portion of all three dimensions thereof produced by a process comprising;
   contacting an inorganic three dimensional substrate which includes external surfaces and shielded surfaces which are at least partially shielded by other portions of said substrate with a composition comprising an iron oxide forming compound other than iron oxide at conditions effective to form an iron oxide-forming compound containing coating on at least a portion of said substrate;
   forming a liquidus iron oxide forming compound containing coating on at least a portion of the three dimensions of said substrate including the shielded surfaces of said substrate;
   contacting said substrate with at least one additional magnetic or conductivity interacting component at conditions effective to form a component-containing coating on at least a portion of said substrate including at least a portion of the three dimensions of said substrate including the shielded surfaces of said substrate; said contacting being initiated at least prior to the substantially complete oxidation of said iron oxide forming compound to iron oxide;
   contacting said substrate having said iron oxide forming compound containing coating and said additional component-containing coating thereon with an oxidizing agent at conditions effective to convert said iron oxide forming compound to iron oxide and form an iron oxide coating with additional magnetic or conductivity interacting component on at least a portion of said three dimensions of said substrate including the shielded surfaces of said substrate.

2. The article of claim 1 wherein said iron oxide forming compound is selected from the group consisting of iron chlorides, iron sulfates, and the hydrates therefore, low molecular weight iron organic complexes and mixtures thereof.

3. The article of claim 1 wherein said iron oxide forming compound is ferric chloride hexahydrate.

4. The article of claim 1 wherein said additional component is an oxide precursor selected from the group consisting of nickel, zinc, manganese, barium, strontium, lead, yttrium, lanthanum, calcium, boron, titanium, silica, the rare earth elements and interacting mixtures thereof.

5. The article of claim 4 wherein said additional component is an oxide precursor selected from the group consisting of nickel, zinc and manganese and said iron oxide forming compound is ferric chloride hexahydrate.

6. The article of claim 1 wherein said substrate is maintained for a period of time at conditions effective to do at least one of the following: (1) coat a larger portion of said substrate with said iron oxide forming compound: (2) distribute said iron oxide forming compound over said substrate; (3) make said iron oxide forming compound-containing coating more uniform in thickness; (4) incorporate said additional interacting component in said iron oxide forming compound coating; and (5) distribute said additional interacting component more uniformly in said iron oxide forming compound containing coating.

7. The article of claim 1 wherein said substrates in a form selected from the group consisting of spheres, extrudates, flakes, fibers, fiber rovings, chopped fibers, fiber mats, porous substrates, irregularly shaped particles and multi-channel monoliths.

8. The article of claim 7 wherein said substrate is a material selected from a the group consisting of nickel, a glass and a ceramic oxide.

9. The article of claim 5 wherein said substrate is selected from the group consisting of spheres, extrudes, flakes, fibers, porous substrates, and irregularly shaped particles.

10. An article comprising a three dimensional inorganic substrate other than magnetic or electrically conductive iron oxide having at least one coating containing magnetic or electrically conductive iron oxide on at least a portion of all three dimensions thereof produced by a process comprising;
    contacting an inorganic three dimensional substrate which includes external surfaces and shielded portions of said substrate with a composition comprising a iron chloride-forming compound at conditions effective to form an iron chloride-forming compound containing coating on at least a portion of said substrate;
    forming a liquidus iron chloride-forming compound containing coating on at least a portion of the three dimensions of said substrate including the shielded surfaces of said substrate and at conditions effective to do at least one of the following: (1) coat a larger portion of said substrate with said iron chloride-forming compound (2) distribute said iron chloride-forming compound over said substrate; and (3) make said iron chloride-forming compound containing coating more uniform in thickness;
    contacting said substrate with said iron chloride-forming compound containing coating with an oxidizing agent at conditions effective to convert the iron chloride-forming compound to iron oxide and form a iron oxide coating on at least a portion of said three dimensions of said substrate including the shielded surfaces of said substrate.

11. The article of claim 10 which further comprises contacting said substrate with at least one additional interacting component at conditions effective to form an additional magnetic or conductivity interacting component containing coating on said substrate, said additional component contacting occurring prior to substantially complete oxidation of said iron chloride forming compound to the oxide.

12. The article of claim 11 wherein said substrate is in a form selected from the group consisting of spheres, extrudates, flakes, fibers, fiber rovings, chopped fibers, fiber mats, porous substrates, irregularly shaped particles and multi-channel monoliths.

13. The article of claim 12 wherein substrate is a material selected from the group consisting of nickel, a glass and a ceramic oxide.

14. An article comprising a three dimensional inorganic substrate other than magnetic or electrically conductive iron oxide having at least one coating containing magnetic or electrically conductive iron oxide on at least a portion of all three dimensions thereof produced by a process comprising;

contacting an inorganic three dimensional substrate with a composition comprising an iron oxide precursor powder other than iron oxide at conditions effective to form a coating containing iron oxide precursor on at least a portion of the substrate;

forming a liquidus iron oxide precursor on at least a portion of the three dimensions of said substrate including the shielded surfaces of said substrate and at conditions effective to do at least one of the following: (1) coat a larger portion of said substrate with said coating containing iron oxide precursor; (2) distribute said coating containing iron oxide precursor over said substrate; and (3) make said coating containing iron oxide precursor more uniform in thickness;

contacting said coated substrate with an oxidizing agent at conditions effective to convert said iron oxide precursor to iron oxide on at least a portion of said three dimensions of said substrate and form a substrate having an iron oxide-containing coating.

15. The article of claim 14 which further comprises contacting said substrate with at least one additional magnetic or conductivity interacting forming component at conditions effective to form an additional forming component containing coating on said substrate, said forming component contacting occurring prior to the substantially complete oxidation of said iron oxide precursor to iron oxide.

16. The article of claim 14 wherein said iron oxide forming compound is selected from the group consisting of iron chlorides, iron sulfates and the hydrates thereof, low molecular weight iron organic complexes and mixtures thereof.

17. The article of claim 16 wherein said iron oxide forming compound is ferric chloride hexahydrate.

18. The article of claim 15 wherein said additional forming component is an additional precursor selected from the group consisting of nickel, zinc, manganese, barium, strontium, lead, the rare earth elements.

19. The article of claim 15 wherein said substrate is in a form selected from the group consisting of spheres, extrudates, fibers, flakes, porous substrates, and irregularly shaped particles.

20. An article comprising a three dimensional inorganic substrate other than an magnetic or electrically conductive iron oxide having a particle type shape and which includes external surfaces and shielded surfaces which are at least partially shielded by other portions of said substrate, said substrate having a coating containing at least one magnetic or electrically conductive interactant associated with the iron oxide coating on at least a portion of said three dimensions of said substrate including the shielded surfaces of said substrate.

21. The article of claim 20 wherein said substrate in a shape selected from the group consisting of spheres, extrudates, flakes, fibers, porous substrates, particles and irregularly shaped particles.

22. The article of claim 21 wherein said substrate is an inorganic oxide and in a shape selected from the group consisting of spheres, extrudates, flakes, fibers, porous substrates, particles and irregularly shaped particles.

* * * * *